United States Patent [19]
Morton et al.

[11] Patent Number: 5,905,536
[45] Date of Patent: May 18, 1999

[54] VIDEO SIGNAL CONVERTER UTILIZING A SUBCARRIER-BASED ENCODER

[75] Inventors: Steven R. Morton; Kenneth Alfred Boehlke, both of Beverton, Oreg.

[73] Assignee: Focus Enhancements, Inc., Wilmington, Mass.

[21] Appl. No.: 08/870,091

[22] Filed: Jun. 5, 1997

[51] Int. Cl.⁶ ................................................. H04N 7/01
[52] U.S. Cl. ........................ 348/441; 348/581; 348/453
[58] Field of Search .................... 348/441, 453, 348/445, 581, 443, 444, 457, 454

[56] References Cited

U.S. PATENT DOCUMENTS

| | | | |
|---|---|---|---|
| 5,229,852 | 7/1993 | Maietta et al. | 348/581 |
| 5,307,156 | 4/1994 | Yamamoto et al. | 358/11 |
| 5,349,385 | 9/1994 | Glenn | 348/458 |
| 5,389,974 | 2/1995 | Bae | 348/555 |
| 5,444,495 | 8/1995 | Takahama et al. | 348/458 |
| 5,455,628 | 10/1995 | Bishop | 348/446 |
| 5,526,055 | 6/1996 | Zhang et al. | |
| 5,528,306 | 6/1996 | Itoh | 348/453 |
| 5,642,169 | 6/1997 | Yamamoto et al. | 348/445 |
| 5,739,867 | 4/1998 | Eglit | 348/441 |
| 5,781,241 | 7/1998 | Donovan | 348/441 |

FOREIGN PATENT DOCUMENTS 0751682  1/1997  European Pat. Off. ......... H04N 5/44

*Primary Examiner*—Victor R. Kostak
*Attorney, Agent, or Firm*—Christopher P. Ricci

[57] ABSTRACT

A video converter converts an input video signal conveying pixel data representing an M×K pixel image to an output video signal conveying data representing an N×L pixel image. The converter samples the input video signal to acquire an M×K matrix of pixel data, re-encodes each pixel data value as necessary to meet color coding requirements of the output video signal standard, and then employs digital interpolation and/or decimation filters to convert the M×K data matrix to an N×L data matrix. A simple digital output encoder operating at four times the output video signal subcarrier frequency is then employed to process the N×L matrix to produce a digital output data sequence which, when applied to D/A converter, becomes the output video signal.

21 Claims, 5 Drawing Sheets

VIDEO SIGNAL CONVERTER UTILIZING A SUBCARRIER-BASED ENCODER

BACKGROUND OF THE INVENTION

1. Field of the Invention

The present invention relates in general to video signal conversion systems and in particular to a video conversion system that selectively alters the dimensions of an image conveyed by an input video signal when converting the input video signal to an output video signal of differing format.

2. Description of Related Art

An image formed by K rows of pixels, with M pixels per row, may be represented by an M×K data matrix having elements of the form X(m,k) where each element represents the color of the mth pixel of the kth row of the image. Elements of such a data matrix can be sequentially encoded into analog signals and mixed with a subcarrier to produce a video signal for conveying the image data, for example, to a display monitor. There are many standards for video signals including, for example, devices which generate video signals following an RGB standard where each element X(m,k) of the data matrix has three values (R,G,B) representing intensities of red, green and blue components of the pixel's color. The PAL and NTSC television systems employ a video signal standard where each matrix element has three values (Y,U,V) where Y is luminance and the U,V data pair defines chrominance. The manner in which data is encoded into the analog video signal, the rate at which pixels are generated on a display (the scan rate), and the video signal subcarrier frequency may differ from one video signal standard to the next.

A video converter receives an input video signal and converts it to an output video signal. In the process, the converter may have to change several aspects of the input video signal including the color encoding scheme, the pixel dimensions of the images, the manner in which the pixel data is encoded into the video signal and the subcarrier frequency.

U.S. Pat. No. 5,526,055 issued Jun. 11, 1996 to Zhang et al describes two similar systems for converting an RGB-encoded video signal to a YUV encoded video signal: a system that is prior art to Zhang's system, and Zhang's system that is a modification to the prior art system. In the prior art system, the RGB video signal is digitized to produce a pixel data sequence which is re-encoded into YUV format and then stored in a memory. The resulting data sequence is then read out of the memory and supplied to an analog signal encoder. The encoder converts the data sequence to analog signals and mixes them with a clock signal oscillating at the output video signal subcarrier frequency to produce the output video signal. As the encoder mixes the analog video data with the subcarrier, it alters the pixel dimensions of the image to match the output video signal standards. Zhang modified the prior art video converter essentially by substituting a digital encoder for the analog encoder. Zhang's digital encoder is rather complex since it must include digital sine and cosine wave generators, multipliers and other components. In either video conversion system it is necessary to closely couple the subcarrier frequencies of the input and output video signals using relatively complicated timing systems employing phase lock loop circuits which may require discrete components.

What is needed is a video converter which can convert an input color video signal representing an input image to an output color video signal representing an output image where the pixel dimensions of the input and output images differ, where the color encoding schemes employed by the input and output signals differ, and where the subcarrier frequencies of the two signals differ. In addition, the video converter should not require the use of several phase lock controllers or complicated analog or digital encoders.

SUMMARY OF THE INVENTION

In accordance with the invention, a video converter converts an input video signal representing an input image to an output video signal representing an output image where the pixel dimensions of the input and output images differ, where the color encoding schemes employed by the input and output signals differ, and where the subcarrier frequencies of the two signals differ.

The converter initially digitizes the input video signal to acquire a first sequence of pixel data elements, wherein a value of each pixel data element represents a color of a separate pixel of the input image in accordance with the input video signal color encoding scheme. The converter then successively re-encodes each pixel data element of the first sequence to produce a corresponding element of a second data sequence representing the color of each pixel of the input image in accordance with the color encoding scheme of the output video signal standard. The converter next employs digital filters to process the second data sequence to produce a third data sequence, wherein a value of each pixel data element of the third data sequence represents a color of a separate pixel of the output image in accordance with the output video signal color encoding scheme. The converter then employs a simple digital encoder to process the third data sequence to produce a fourth data sequence which is a digital version of the output video signal. A D/A converter then converts the fourth data sequence to the output video signal.

It is accordingly an object of the present invention to provide an apparatus for converting an input video signal to an output video signal in which pixel dimensions of images conveyed by the input and output video signals differ.

It is another object of the present invention to provide an apparatus for converting an input video signal to an output video signal wherein the color encoding schemes employed by the input and output signals differ, It is a further an object of the present invention to provide an apparatus for converting an input video signal to an output video signal wherein the subcarrier frequencies of the input and output video signals differ.

It is yet another object of the invention to provide an apparatus for converting an input video signal to an output video signal that can be substantially implemented in integrated circuit form without requiring the use of several phase lock controllers or complicated analog or digital encoders.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

DESCRIPTION OF THE PREFERRED EMBODIMENT(S)

An image formed by K rows of pixels, with M pixels per row, may be represented by an M×K data matrix having elements the form X(m,k) where each element represents the color of the mth pixel of the kth row of the image. There are various ways of representing pixel color. Personal computers typically follow the RGB standard where each element X(m,k) of the data matrix has three values (R,G,B) representing intensities of red, green and blue components of the pixel's color. The PAL and NTSC television systems employ a YUV encoding scheme in which each element has three values (Y,U,V) where Y is luminance (brightness) and the U,V data pair defines chrominance (hue). A video signal conveys each successive element of each successive line of a data matrix.

The present invention is a video converter for converting an input video signal conveying an image encoded in one standard, for example RGB, into an output video signal conveying the same image encoded in a different standard, for example YUV. The video converter of the present invention could be used, for example, to generate an output YUV video signal for producing a display on a television monitor in response to an input RGB video signal produced by a personal computer.

A video converter must do more than simply convert from one color encoding scheme to another. For example the horizontal and/or vertical sizes of data matrix defining the input image may differ from that of the data matrix defining the output image. In other words, the images conveyed by the input an output video signals may differ in the number of pixels per horizontal line or in the number of lines. In such case, the video converter must not merely convert each input RGB value to a corresponding YUV value, it must also alter the horizontal and vertical dimensions of the data matrix conveying the image information in a way that preserves the essential character of the image to the extent possible.

Figure 1:
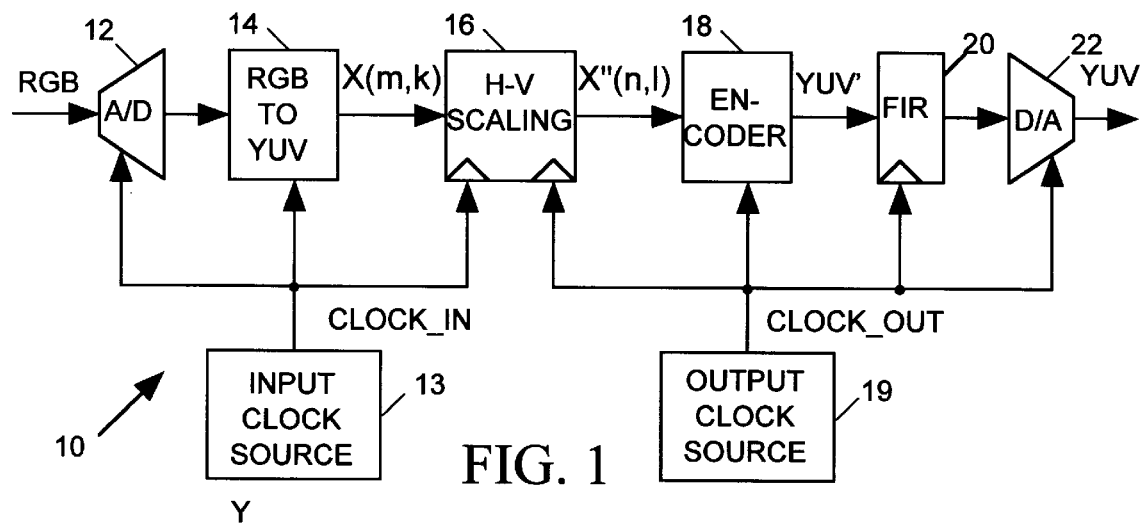
FIG. 1 illustrates in block diagram form a video converter in accordance with the present invention.

FIG. 1 illustrates in block diagram form a video converter 10 in accordance with the present invention for converting an input RGB-encoded video signal RGB to an output YUV-encoded video signal YUV. The analog input signal RGB is encoded to convey an M×K matrix of RGB-encoded data defining an image formed by K rows of M pixels per row. The matrix appears in the RGB signal in sequential form, on a row-by-row, pixel-by-pixel basis. The output signal YUV conveys an N×L element matrix of YUV-encoded data defining an image formed by L rows of N pixels per row. The N×L matrix appears in the YUV signal in sequential form, on a row-by-row, pixel-by-pixel basis. The input and output images defined by the pixel data carried by the two video signals are generally similar in appearance but differ in pixel resolution when N and M and/or L and K differ.

Video converter 10 includes an A/D converter 12 for sampling the input video signal RGB at an appropriate rate controlled by a CLOCK_IN signal produced by a clock source 13 to produce a sequence of (R,G,B) data values supplied to an RGB to YUV encoder 14. Encoder 14 converts each input RGB value to an equivalent output YUV value in a well-known manner to produce an M×K element output sequence having YUV-encoded elements of X(m,k). Thus there is one element X(m,k) for each pixel of the input image and that element employs YUV encoding.

A horizontal-vertical scaling unit 16 next converts the X(m,k) element sequence into an M×L element output sequence having YUV-encoded elements X"(n,l). Thus unit 16 produces one X"(n,l) YUV-encoded element for each pixel of the output image. A digital output encoder 18, clocked by a CLOCK_OUT signal produced by another clock source 19, encodes the X"(n,l) elements to produce an output data sequence YUV' filtered by a conventional FIR luma (Y) notch and UV bandpass filter 20. The result is then supplied as input to a D/A converter 22. The CLOCK_OUT signal has a frequency four times that of the desired output video signal subcarrier frequency. A digital-to-analog (D/A) converter 22 then converts the YUV' sequence into the analog YUV output signal. Note that the input and output clock sources are independent and not phase locked to one another.

Figure 2:
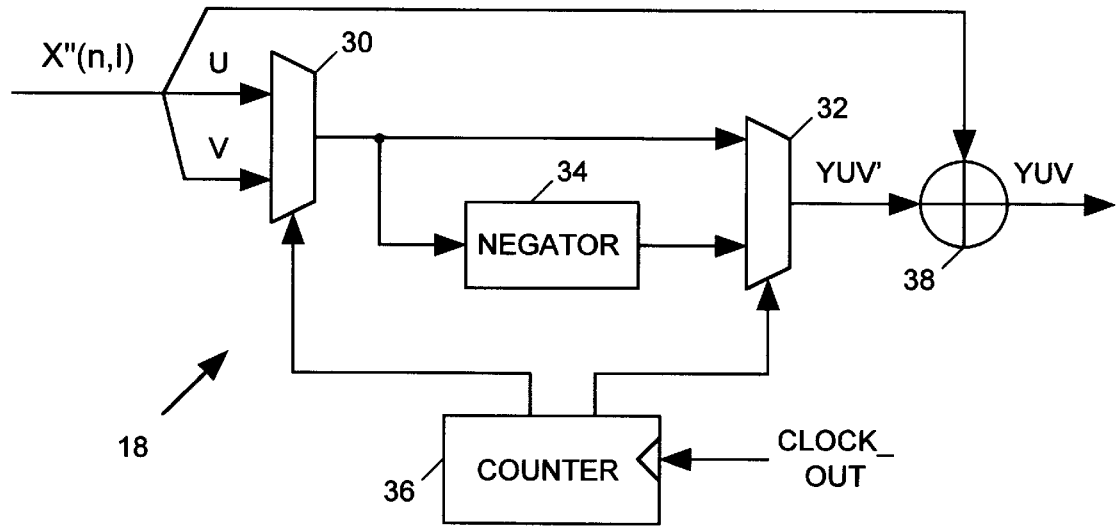
FIG. 2 illustrates the output encoder of FIG. 1 in more detailed block diagram form.

FIG. 2 illustrates output encoder 18 of FIG. 1 in more detailed block diagram form. The U and V components of each incoming X"(n,l) data element are supplied to separate inputs of a multiplexer 30. The output of multiplexer 30 is supplied to an input of another multiplexer 32. The output of multiplexer 30 output is also negated by a negator 34 and supplied to another input of multiplexer 32. The switching states of multiplexers 30 and 32 are controlled by separate output bits of a two-bit counter 26 clocked by the CLOCK_OUT signal. An adder 38 sums the output of multiplexer 32 with the Y component of the input X"(n,l) data element to produce the YUV' output encoder 18 output data.

Mixer 18 and D/A converter 20 implement the following relation:

$$YUV = Y + U \sin(w_{sc}t) + V \cos(w_{sc}t)$$

where $w_{sc}$ is the output video subcarrier frequency. The above relation matches the PAL and NTSC standards when encoder 14 appropriately scales the Y,U and V values. Note that the Y value appears as a DC offset to the output video subcarrier. Since the CLOCK_OUT signal has a frequency $4w_{sc}$, the value of $\sin(w_{sc}t)$ periodically steps through the set of discrete values $\{0,1,0,-1\}$ while the value of the term $\cos(w_{sc}t)$ periodically steps through the set of discreet values $\{1,0,-1,0\}$. Thus the chrominance term, $U \sin(w_{sc}t) + V \cos(w_{sc}t)$, periodically steps through on discrete values V,U,-V,-U with successive pulses of the CLOCK_IN signal.

The simplicity of encoder 18 is possible because pixel data values are supplied to the encoder 18 at precisely four times the subcarrier frequency of the output signal. If the pixels were supplied at any other rate, encoder 18 would have to supply sine and cosine values other than 0, 1, and −1, and use multipliers to multiply those sine and cosine values by the U and V values. The pixels data elements X(m,k) supplied as input to horizontal/vertical scaling circuit 18 have the proper color encoding for the output image, but they do not appear at the appropriate rate to be supplied directly to encoder 18. In prior art systems this problem is resolved by providing complicated analog or digital output encoder that can multiply U and B by sine and cosine values other than 0, 1 and −1. However, in accordance with the present invention, horizontal/vertical scaling circuit 16 of FIG. 1 appropriately alters the size of the pixel data matrix defining the image delivers elements of the altered data matrix to output encoder 18 at the appropriate rate to permit the use of simple encoder 18 logic illustrated in FIG. 2. Also, since the YUV' data output of encoder 18 is at frequency $4W_{SC}$, the conventional FIR filter 20, also clocked by source 19, may be of equally simple construction.

Vertical Compression/Horizontal Expansion

Depending on the requirements of the output video signal standard, the output image may have fewer or more pixel lines than the input image and may have fewer or more pixels per line than the input image. The horizontal/vertical scaling unit 16 is designed to adjust the size of its output X"(n,l) matrix to match the pixel dimension of the output image and to do so in a way that preserves the appearance of the image to the extent possible for a given change in image resolution.

Figure 3:
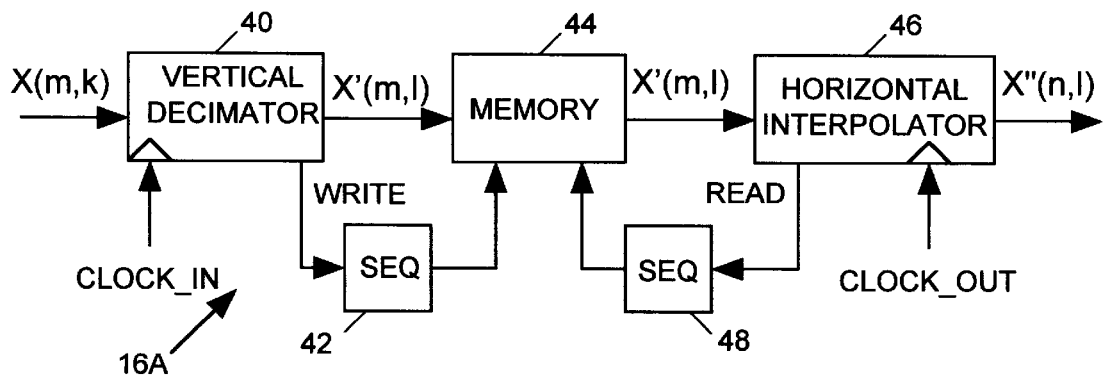
FIGS. 3–6 illustrates alternative versions the horizontal-vertical scaling circuit of FIG. 1.

FIG. 3 illustrates a version 16A of horizontal-vertical scaling circuit 16 of FIG. 1 wherein the number L of lines in the output image is less than the number of lines K in the input image and wherein the number N of pixels per line in the output image is greater than the number M of pixels per line in the input image. Each element X(m,k) of the M×K element input sequence is supplied in succession to a vertical decimator circuit 40 clocked by the CLOCK_IN signal. A next pixel data value X(m,k) is supplied to decimator 40 on each pulse of the CLOCK_IN signal.

Decimator 40 processes the input data to produce an M×L element output sequence having elements of the form X'(m,l). Note that the output sequence decimator 40 produces has fewer elements than the input sequence it receives because L is smaller than K. Thus an image defined by the output sequence of elements X'(m,l) has fewer lines than the input image defined by X(m,k). As described in more detail below, decimator 40 computes the value of each element X'(m,l) of its output sequence as a weighted combination of values of selected elements X(m,k) of its input sequence so that the color of a pixel in any particular line the output image is a weighted combination of colors of pixels in lines of the input image.

Whenever decimator 40 produces an output data element X'(m,l) it transmits an output WRITE signal pulse to a sequencer 42. In response to each WRITE signal pulse, sequencer 42 supplies an address and a write control signal to a two-port memory 44 causing memory 44 to store successive decimator 40 output data values X'(m,l) at successive addresses therein.

Meanwhile, a horizontal interpolator 46, clocked by the CLOCK_OUT signal, successively reads X'(m,l) data values back out of memory 44 and processes those data values to produce the output data sequence X"(n,l). Horizontal interpolator 44 supplies a READ signal pulse to a sequencer 48 whenever it needs a next input data value from memory 44. Sequencer 48 responds to the READ signal by appropriately addressing and read enabling the data output port of memory 44.

Note that the output sequence produced by horizontal interpolator 46 has N×L elements while its input sequence has M×L elements. Since N is greater than M, an output image defined by the interpolator 46 output sequence has more pixels per line than an input image defined by its input sequence. If we were to superimpose the input and output images, the lines of the two images would coincide but pixels on each line of the output image would be horizontally closer together than pixels in the input image. As described in detail below, interpolator 46 calculates the value of each output sequence element X"(n,l) for each pixel of the output image as a weighted combination of values of input sequence elements for horizontally adjacent pixels of the input image.

While vertical decimator 40 is clocked by the CLOCK_IN signal, horizontal interpolator 46 is clocked by the CLOCK_OUT signal. Vertical decimator 40 reads input data elements at the same average rate that horizontal interpolator 46 generates output data elements, but there is a varying delay between the time decimator 40 produces an output value and the time interpolator 46 may need to read it. Memory 44 at the boundary of the two clock systems, acts as a buffer between decimator 40 and interpolator 46 to decoupled the read and write timing of the two circuits to account for short term variation in data read and write rates.

Horizontal Compression/Vertical Expansion

Figure 4:
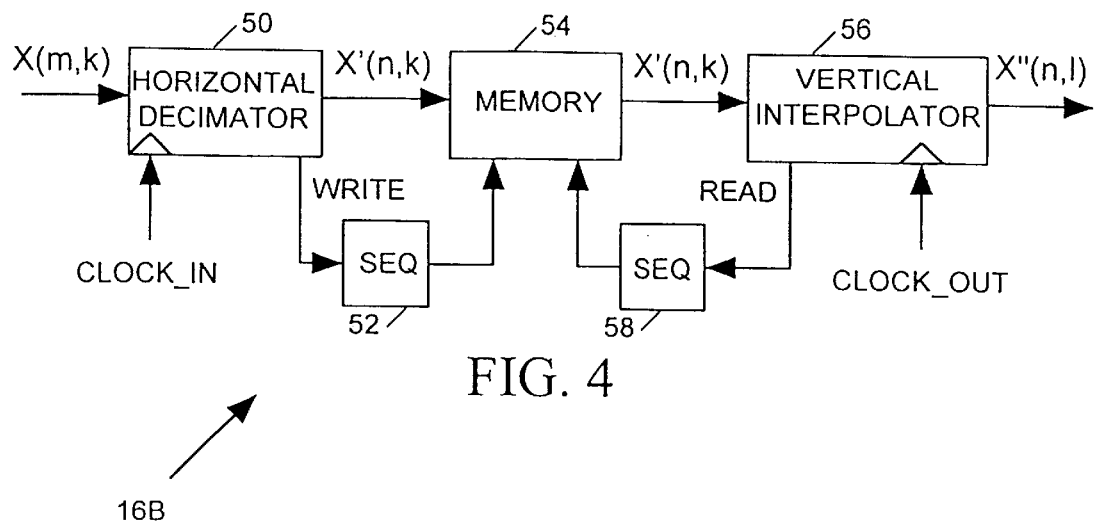

FIG. 4 illustrates a second version 16B of horizontal-vertical scaling circuit 16 of FIG. 1 wherein the number L of lines in the output image is greater than the number of lines K in the input image and the number N of pixels per line in the output image is less than the number M of pixels per line in the input image. Each element X(m,k) of the M×K element input sequence is supplied in succession to a horizontal decimator circuit 50 clocked by the CLOCK_IN signal. Decimator 50 produces an N×K element output sequence having elements of the form X'(n,k). Note that the output sequence decimator 50 produces has fewer elements than the input sequence it receives because N is smaller than M. Thus, an image defined by the output sequence of elements X'(n,k) has fewer pixels per line than the input image defined by X(m,k). As described in more detail below, horizontal decimator 50 computes the value of each element X'(n,k) of its output sequence as a weighted combination of input values X(m,k) defining horizontally adjacent pixels of its input image.

Whenever decimator 50 produces an output data element X'(n,k) it transmits an output WRITE signal pulse to a sequencer 52. In response to each WRITE signal pulse, sequencer 52 supplies an address and a write control signal to a two-port memory 54 causing memory 54 to store successive data values X'(n,k) at successive addresses therein. Meanwhile, a vertical interpolator 56, clocked by the CLOCK_OUT signal, successively reads X'(n,k) data values out of memory 54 and processes those data values to produce the output data sequence X"(n,l). Vertical interpolator 54 supplies a READ signal pulse to a sequencer 58 whenever it needs a next input data value from memory 54. Sequencer 58 responds to the NEXT signal by appropriately addressing and read enabling the data output port of memory 54.

Note that the output sequence produced by vertical interpolator 56 has M×L elements while its input sequence has N×K elements. Since L is greater than K, an output image defined by the interpolator 56 output sequence has the same number of pixels per line as an input image defined by its input sequence, but has more lines. As described in detail below, interpolator 56 calculates the value of each output sequence element X"(n,l) for each pixel of the output image as a weighted combination of values of input sequence elements for vertically nearby pixels of the input image.

Vertical Compression/Horizontal Compression

Figure 5:
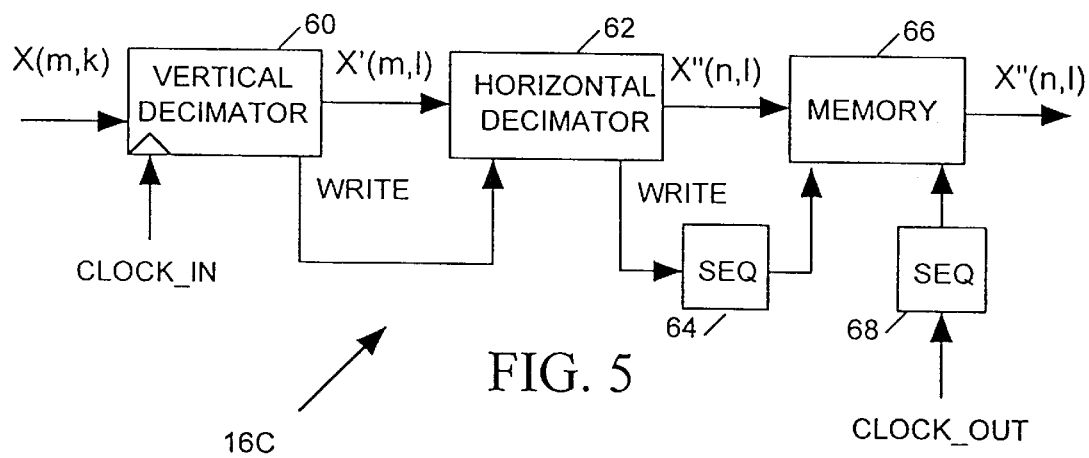

FIG. 5 illustrates a third version 16C of horizontal-vertical scaling circuit 16 of FIG. 1 wherein the number L of lines in the output image is less than the number of lines K in the input image and the number N of pixels per line in the output image is less than the number M of pixels per line in the input image. Each element X(m,k) of the M×K element input sequence is supplied in succession to a vertical decimator circuit 60 clocked by the CLOCK_IN signal. Decimator 60 produces an M×L output sequence having elements of the form X'(m,l). Thus, an image defined by the output sequence of elements X'(m,l) has fewer lines than the input image defined by X(m,k). Whenever decimator 60 produces an output data element X'(m,k) it transmits an output WRITE signal pulse a horizontal decimator 62.

A horizontal decimator circuit 62 clocked by the WRITE signal reads in and processes the sequence of X'(m,l) elements to produce produces an M×L output sequence having elements of the form X"(n,l). The image defined by the output sequence of elements X"(n,l) has fewer pixels per line the input image defined by sequence X'(m,l) because N is less than M. Whenever decimator 62 produces an output data element X'(m,k) it transmits an output WRITE signal pulse to a sequencer 64. Sequencer 64 supplies an address and a write control signal to an input port of a two-port memory 66 causing memory 66 to store successive data values X"(n,l) at successive addresses therein. A second sequencer 68, clocked by the CLOCK_OUT signal, reads enables X"(n,l) data values at successive addresses within memory 66 so that it may be supplied to output encoder 18 of FIG. 1.

Vertical Expansion/Horizontal Expansion

Figure 6:
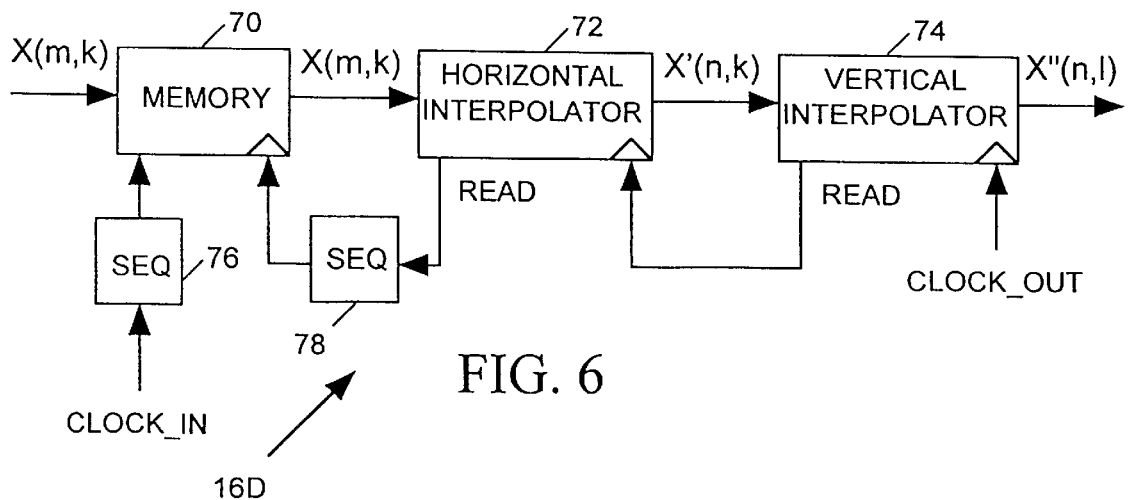

FIG. 6 illustrates a fourth version 16D of horizontal-vertical scaling circuit 16 of FIG. 1 wherein the number L of lines in the output image is greater than the number of lines K in the input image and the number N of pixels per line in the output image is greater than the number M of pixels per line in the input image. Each element X(m,k) of the M×K element input sequence is supplied in succession to an input port of a two-port memory 70 write enabled by a sequencer 72 clocked by the CLOCK_IN signal. Memory 70 stores incoming elements X(m,k) at successive addresses therein. A horizontal interpolator 72 supplies a succession of READ signal pulses to a sequencer 78. In response to each successive READ signal pulse sequencer 78 read enables a successive address of memory 70, thereby supplying the sequence X(m,k) to horizontal interpolator 72.

Horizontal interpolator 72, clocked by a READ signal form vertical interpolator 74 produces an N×K output sequence having elements of the form X'(n,k) having more pixels per line than the image defined by its input sequence X(m,k). A vertical interpolator circuit 74 clocked by the CLOCK_OUT signal reads in and processes the sequence of X'(n,k) elements to produce the N×K output sequence having elements of form X"(n,l) and defining an image having more lines than the image defined by its input sequence.

If we compare FIGS. 3–6, we see that timing of all circuitry on the input side of each memory is derived from the CLOCK_IN signal and the timing of all circuitry on the output side of each memory is derived from the CLOCK_OUT signal. While pixel data is written into a memory at the same average rate that it is read out of a memory, during short periods of time data may be written into a memory at a different rate than it is read. The memory acts as a buffer to smooth out short term variations between data read and write rates.

Vertical Decimator

Figure 7:
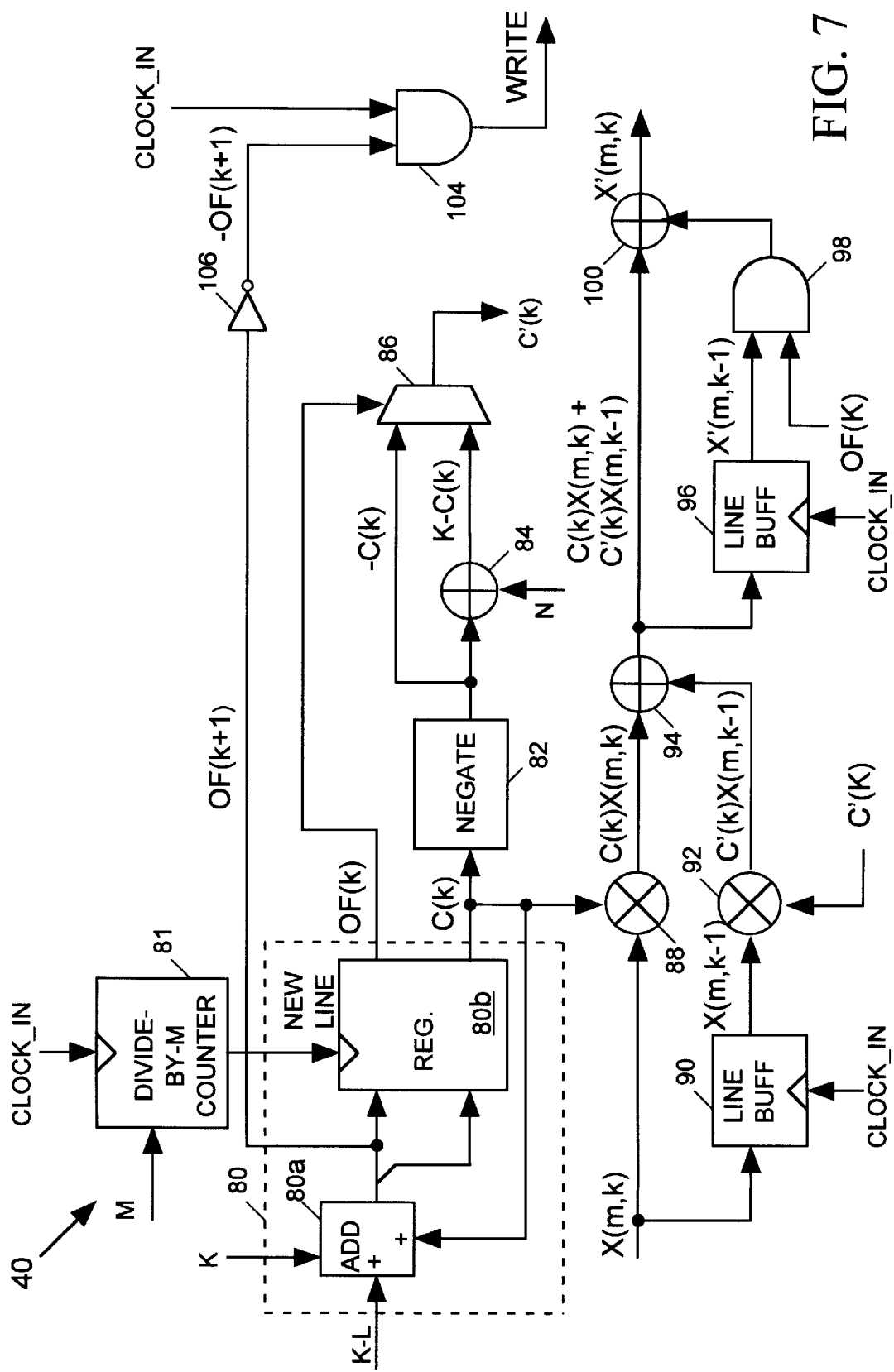
FIG. 7 illustrates the vertical decimator of FIG. 3 in more detailed block diagram form.

FIG. 7 is a block diagram the vertical decimator 40 of FIG. 3 which converts the input data sequence conveying the M×K pixel data matrix of values X(m,k) representing a high resolution image into the output data sequence conveying a M×L pixel data matrix of values X'(m,l) representing the lower resolution image using fewer pixel lines. Decimator 26 calculates a sequence of values X'(m,k) according to the following algorithm (expressed in pseudocode):

```
Err(O)      = 0
C(0)        = 0
X'(m,-1)    = 0
X'(m,-2)    = 0
C(k+1)      = Modulo(C(k)+K-L,K)
If C(k+1)<M then OF(k+1) = 1 Else OF(k+1) = 0
If OF(k) = 0 and k > 0 then
    C'(k) = K - C(k)
    X'(m,k) = C(k)*X(m,k) + C'(k)*X(m,k-1)
Else
    C'(k) = -C(k)
    X'(m,k-1) = INVALID
    Err(m,k) = C(k)*X(m,k)+C'(k)*X(m,k-1)
    X'(m,k) = X'(m,k-1)+Err(m,k)
End if
```

Decimator 40 produces a WRITE signal pulse only for valid elements of the output sequence X'(m,k) in memory 44. Thus a sequence of valid X'(m,k) elements are stored in memory 44 as decimator output sequence X'(m,l).

Referring again to FIG. 7, decimator 40 includes an accumulator 80 including an adder 80a and a register 80b for generating the coefficient C(k). C(k) is a weight given to the current input sequence value X(m,k) when computing the current output sequence value X'(m,l). The input constant (K−L) is supplied to adder 80a. Register 80b is clocked by the output of a divide-by-M counter 81 clocked by the CLOCK_IN signal. The output of register 80b, coefficient C(k), is fed back to adder 80a. Coefficient C(k) increases for each line of output image pixels (M CLOCK_IN signal periods) by the amount of (K−L). Thus C(k) changes regularly with 1, the output image pixel line number, with the change being determined by the value of (K−L). When adder 80a overflows upon counting to K, it generates an overflow signal OF (k+1) which passes through register 80b as OF(k).

A negator 82 negates C(k) to produce −C(k) and an adder 84 adds K to −C(k) to produce K−C(k). The −C(k) output of negator 82 and the K−C(k) output of adder 84 are applied to inputs of a multiplexer 86 controlled by the OF(k) signal. Multiplexer 86 produces C'(k) as its output.

A multiplier 88 multiplies the incoming pixel data value X(m,k) by C(k). A line buffer 90 delays each incoming X(m,k) pixel data value by M CLOCK_IN pulses so that it later becomes output pixel data value X(m,k−1) when the pixel data value for the adjacent pixel h of next line arrives at decimator 40. A multiplier 92 multiplies the X(m, k−1) output pixel data value of buffer 90 by the C'(k) coefficient output of multiplexer 86. An adder 94 sums the outputs of multipliers 88 and 92.

A line buffer 96 delays the output of adder 94 by M CLOCK_IN signal pulses (one line of pixel data) to produce the value X'(m,k−1). The OF(k) signal generated by adder 80 drives all bits of an input of an AND gate 98 which receives the output of adder 94 at a second input. AND gate 98 produces the Err(k) term of the pseudocode as output. An adder 100 sums the outputs of adder 94 and AND gate 98 to produce an output data value X'(m,k). This value is loaded into memory 44 of FIG. 3 as output sequence element X'(m,l) in response to a pulse of a WRITE signal produced by an AND gate 104. The CLOCK_IN signal drives one input of AND gate 104 and the OF(k+1) signal, inverted by an inverter 106, drives a second input of register 102.

Memory 44 of FIG. 3 only stores valid valued of X'(m,k) as output pixel data matrix values X'(m,l).

Suppose the ratio (K−L)/K supplied to accumulator 80 is 10/16 and that the value of K is 16. Table I illustrates the results of decimator 26 operation. (For simplicity, the "m" subscripts of X and X' are omitted.)

TABLE I

| K | OF | C(k) | C'(k) | X'(k) | Err(k−1) | X'(l) | p |
|---|----|----|-----|-----|--------|-----|---|
| 0 | 1 | 0 | 0 |  | 0 | 0 | 0 |
| 1 | 0 | 3 | 5 | 3X(1)+5X(0) | — | 3X(1)+5X(0) | 1 |
| 2 | 0 | 6 | 2 | 6X(2)+2X(1) | — |  |  |
| 3 | 1 | 1 | −1 |  | 1X(3)−1X(2) | 1X(3)+5X(2)+2X(1) | 2 |
| 4 | 0 | 4 | 4 | 4X(4)+4X(3) | — | 4X(4)+4X(3) | 3 |
| 5 | 0 | 7 | 1 | 7X(5)+1X(4) | — |  |  |
| 6 | 1 | 2 | −2 |  | 2X(6)−2X(5) | 2X(6)+5X(5)+1X(4) | 4 |
| 7 | 0 | 5 | 3 | 5X(7)+3X(6) | — |  |  |
| 8 | 1 | 0 |  |  | 0 | 5X(7)+3X(6) | 5 |
| 9 | 0 | 3 | 5 | 3X(9)+5X(8) | — | 3X(9)+5X(8) | 6 |
| 10 | 0 | 6 | 2 | 6X(10)+2X(9) | — |  |  |
| 11 | 1 | 1 | −1 |  | 1X(11)−1X(10) | 1X(11)+5X(1)+2X(9) | 7 |
| 12 | 0 | 4 | 4 | 4X(12)+4X(11) | — | 4X(12)+4X(11) | 8 |
| 13 | 0 | 7 | 1 | 7X(13)+1X(12) | — |  |  |
| 14 | 1 | 2 | −2 |  | 2X(14)−2X(13) | 2X(14)+5X(13)−1X(12) | 9 |
| 15 | 0 | 5 | 3 | 5X(15)+3X(14) | — | 5X(15)+3X(14) | 10 |

Several values of X'(k) have three terms, weighted pixel data values X(k), X(k−1) and X(k−2) of three vertically adjacent pixels of the input high resolution image. Note that the three weighted terms required three multiplications even though decimator 40 employs only two multipliers to carry them out.

Note also that when X'(k) has three terms, the coefficient of X(k−2) is negative. This means that a high resolution image pixel can have a negative influence on a low resolution image pixel. For example if pixel values X(k) were a measure of pixel brightness, increasing the brightness of a pixel of the low resolution image can have the effect of decreasing the brightness of a pixel of the high resolution image. We can understand this curious effect if we look carefully at Table I. Suppose we double the value of X(10). This would double the brightness of a high resolution image pixel on line k=10 controlled by X(10). Since X(10) has a negative influence on the X'(7), the low resolution image pixel on line l=7 controlled by X'(7) will grow dimmer as we increase X(10). But X(10) has a much larger positive influence on X'(6) controlling the neighboring low resolution image pixel on line l=6. Thus as we increase X(10) we increase the brightness of the pixel on line l=6 more than we decrease the brightness of the pixel on line l=7. Thus the low resolution image in the area of the pixels on lines l=6 and l=7 appears generally brighter when the two pixels are viewed as a group.

Vertical decimator 60 of FIG. 5 is substantially similar in construction and operation to vertical decimator 40 of FIG. 3 and is not separately detailed herein.

Horizontal Decimator

Figure 8:
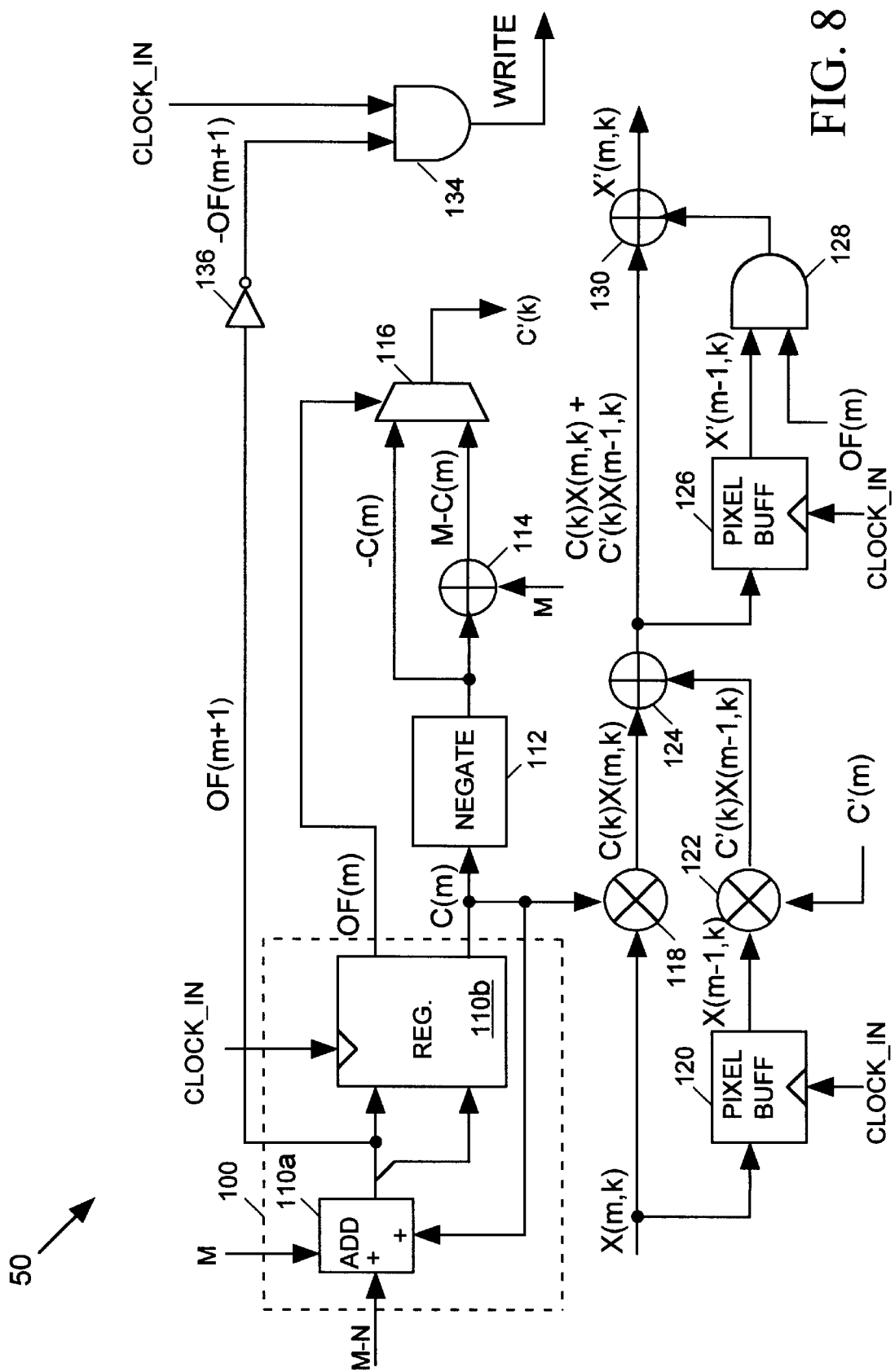
FIG. 8 illustrates the horizontal decimator of FIG. 4 in more detailed block diagram form.

FIG. 8 is a block diagram the horizontal decimator 50 of FIG. 4 which converts the input data sequence conveying the M×K pixel data matrix of values X(m,k) representing a high resolution image into the output data sequence conveying a N×K pixel data matrix of values X'(n,k) representing the lower resolution image using fewer pixels per line. Decimator 26 calculates each value X'(n,k) of the output matrix according to the following algorithm (expressed in pseudocode):

```
Err(0)    = 0
C(0)      = 0
X'(−1,k)  = 0
X'(−2,k)  = 0
C(m+1)    = Modulo(C(m)+M−N,M)
If C(m+1)<M then OF(m+1) = 1 Else OF(m+1) = 0
If OF(m) = 0 and m > 0 then
   C'(m) = K − C(m)
   X'(m,k) = C(m)*X(m,k) + C'(m)*X(m−1,k)
Else
   C'(m) = −C(m)
   X'(m−1,k)=INVALID
   Err(m,k) = C(m)*X(m,k)+C'(m)*X(m−1,k)
   X'(m,k) = X'(m−1,k)+Err(m,k)
End if
```

Decimator 50 writes only valid output data values X'(n,m) to memory 54 of FIG. 4 as the X'(n,l) decimator output sequence.

Referring again to FIG. 8, decimator 50 includes an accumulator 110 including an adder 110a and a register 110b for generating the coefficient C(m). C(m) is a weight given to the current input sequence value X(m,k) when computing the current output sequence value X'(n,l). The input constant (M−N) is supplied to adder 110a. Register 110b is clocked by the CLOCK_IN signal. The output of register 110b, coefficient C(m), is fed back to another of its inputs so that C(m) increases for each successive pixel of each line of the output image by the amount of (M−N). Thus C(m) changes regularly with m, the output image pixel index, with the change being determined by the value of (M−N). When adder 110a overflows upon counting to M, it generates an overflow signal OF. The value of m is supplied as input to adder 110a to tell it when to overflow A negator 112 negates C(m) to produce −C(m) and an adder 114 adds M to −C(m) to produce M−C(m). The −C(m) output of negator 112 and the M−C(m) output of adder 114 are applied to inputs of a multiplexer 116 controlled by the OL signal from adder 110. Multiplexer 116 produces C'(m) as its output.

A multiplier 118 multiplies the incoming pixel data value X(m,k) by C(m). A pixel buffer 90 delays each incoming X(m,k) pixel data value by one CLOCK_IN period so that it later becomes output pixel data value X(m-1,k) when the pixel data value for the adjacent pixel h of next line arrives at decimator 50. A multiplier 122 multiplies the X(m-1) output pixel data value of pixel buffer 120 by the C'(m) coefficient output of multiplexer 116. An adder 124 sums the outputs of multipliers 118 and 122.

A pixel buffer 126 delays the output of adder 124 by one CLOCK_IN signal pulse to produce the value X'(m-1,k)= C(m-1)*X(m-1,k)+C'(m-1)*X(m-2,k) supplied as an input to an AND gate 128. The OF(m) signal drives all bits of a second input of AND gate 128. An adder 130 sums the outputs of multiplexer 128 and adder 124 to produce an output data value X'(m,k). This value is loaded into memory 54 of FIG. 4 in response to a pulse of the CLOCK_IN signal produced by an AND gate 134. The CLOCK_IN signal drives one input of AND gate 134 and the OF(m+1) signal, inverted by an inverter 136, drives a second input of AND gate 134. The "valid" pixel data values X'(m,k) are stored sequentially in memory 54 of FIG. 4 as sixteen X'(n,k) pixel data values.

The operation of the horizontal decimator 50 of FIG. 8 is substantially similar to the vertical decimator 40 of FIG. 7 except that whereas decimator 40 computes the value X'(m, l) of each output image pixel as a weighted combination of values X(m,k-2), X(m,k-1) and X(m,k) of two or three vertically adjacent pixels of the input image, decimator 50 computes each output image pixel as a weighted combination of two or three values X(m-2,k), X(m-1,k), and X(m,k) of horizontally adjacent pixels of the input image.

Horizontal decimator 62 of FIG. 5 is substantially similar in construction and operation to horizontal decimator 50 of FIG. 4 and is not separately detailed herein.

Vertical Interpolator

Figure 9:
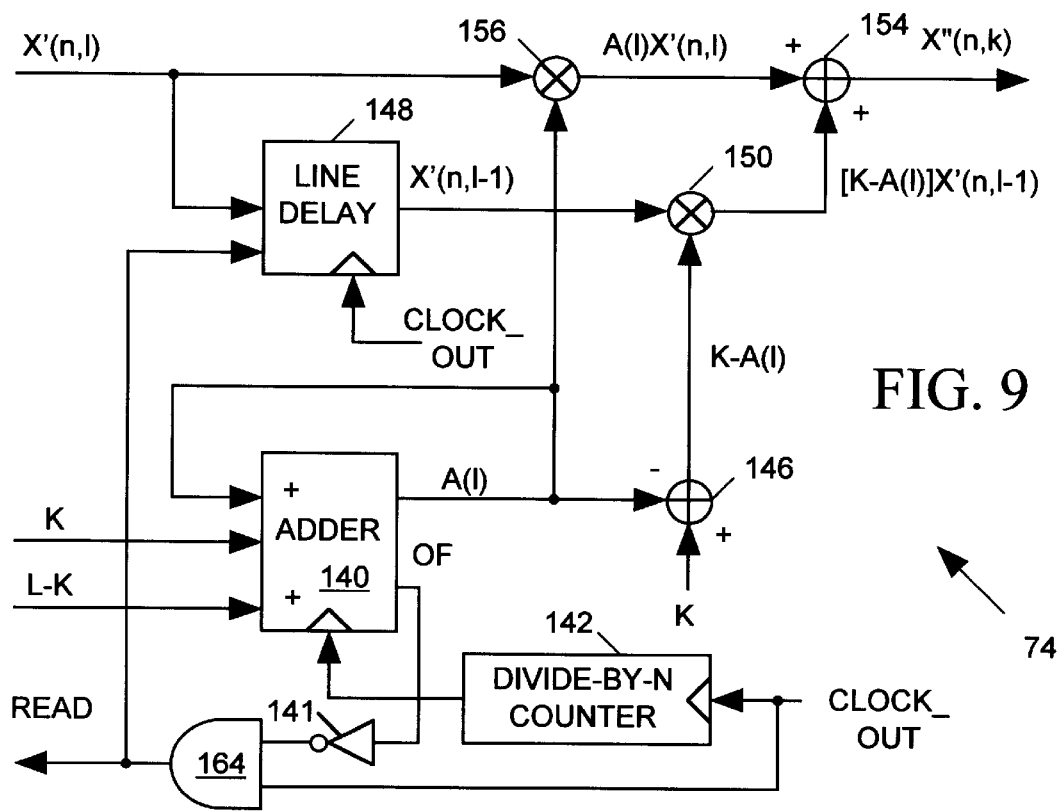
FIG. 9 illustrates the vertical interpolator of FIG. 4 in more detailed block diagram form.

FIG. 9 illustrates vertical interpolator 74 of FIG. 6 in more detailed block diagram form. Interpolator 74 converts the input data sequence conveying an N×L pixel data matrix of values X'(n,l) into an output data sequence conveying a N×K pixel data matrix of values X"(n,k). For vertical interpolator 74, K>L and the output image has more lines than the input image. If the input and output images have the same dimensions and are superimposed, each pixel of the output image would either coincide with a pixel of the input image or would be vertically bounded by two adjacent pixels lines of the input image. Interpolator 74 computes the value X"(n,k) of each output image pixel as either the value X"(m,l) of a coincident pixel of the input image, or as a weighted average of values X'(n,l-1) and X'(n,l) of two vertically bounding pixels of the input image. Interpolator 74 calculates each value X"(n,k) of the output matrix according to the following algorithm (expressed in pseudocode):

A(-1) = 0
1 = 0
For k = 1 to K
 For n = 1 to N
  A(1)  = modulo(A(l-1)+(L-K),K)
  X"(n,k) = A(1)X'(n,1)+[K-A(1)]X'(n,1-1)
  If A(1-1)+(L-K) < K then 1 = 1+1
 Next n
Next k
End Referring to FIG. 9, an adder 140 clocked by the output of a divide-by-N counter 142 produces the A(l) coefficient by accumulating an input constant L-K. The CLOCK_OUT signal clocks counter 142 so that counter 142 generates a pulse at the end of every line k of the output image. Thus adder 140 increments its output coefficient A(l) after data values X"(n,k) for each line k have been computed. When the count reaches the value of a count limit determined by input constant K, adder 140 drives an output overflow signal OF high. An AND gate 164 receiving the OF signal via an inserter 161 and the CLOCK_OUT signal produces the READ signal sent to memory 54 of FIG. 4 causing a next pixel data value X'(n,l) not to be read out of memory. That data value is supplied to a line delay circuit 148 clocked by the CLOCK_OUT signal and write enabled by the READ signal. Line delay circuit 148 delays each input pixel data value by N periods of the CLOCK_OUT signal so that each pixel emerges from line delay circuit 148 as X'(n,l-1). If line delay circuit 148 is not write enabled, each data value stored therein appears at its output periodically, every N pulses of the CLOCK_OUT signal. When line delay circuit 148 is write enabled, the input X'(n,l) is written over the last output value.

A subtractor 146 subtracts the A(l) output of adder 140 to produce the coefficient 1-A(l). A multiplier 150 multiplies the outputs of line delay circuit 148 and subtractor 146 to produce the term [K-A(l)]X'(n,l-1). A multiplier 156 multiples A(l) by the incoming X'(n,l) value and an adder 154 sums the result with the output of multiplier 150 to produce the output pixel data value X"(n,K).

Table II below illustrates a simple example of interpolator 46 operation for the nth pixel of five successive rows of pixels when the output image has five lines (K=5) and the input image has four lines (L=4). For simplicity the "n" subscripts of X' d X" have been dropped.

TABLE II

| k | l | A(1) | OF | X"(k) |
|---|---|------|----|-------|
| 0 | 0 | 4 | 0 | 4X'(0) |
| 1 | 1 | 3 | 0 | 3X'(1)+1X'(0) |
| 2 | 2 | 2 | 0 | 2X'(2)+2X'(0) |
| 3 | 3 | 1 | 0 | 1X'(3)+3X'(2) |
| 4 | 3 | 0 | 1 | X'(3) |

Table II shows that five rows (k=0 through 4) of output pixel data X"(k) are computed from four rows (l=0 through 3 of input pixel data X'(l). Since output image lines k=0 and k=4 coincide with input image lines 1=0 and 1=3, X'(0) and X'(3) are given full weight when computing X"(0) and X"(4), respectively. Output pixels values for lines k=1, 2 and 3 are computed as weighted averages of two adjacent input image pixel data values because these output image lines fall between two lines of the input image.

Vertical Interpolator 56 of FIG. 4 is substantially similar in construction and operation to vertical interpolator 74 of FIG. 6 and is not separately detailed herein.

Horizontal Interpolator

Figure 10:
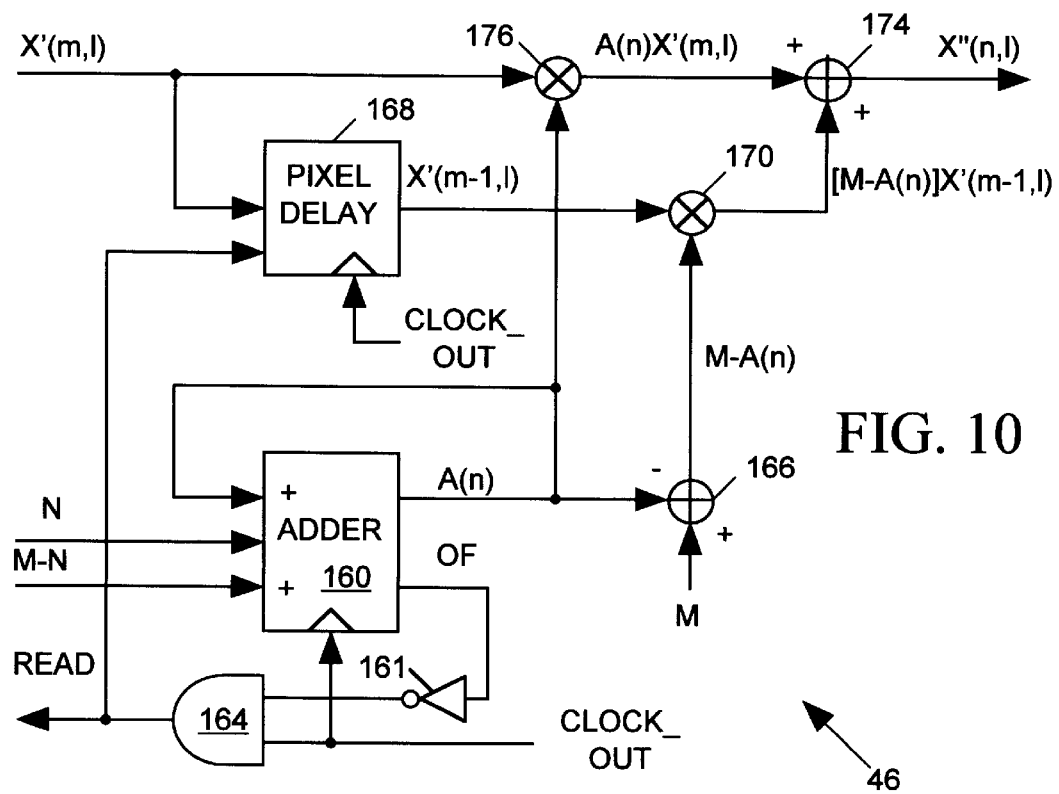
FIG. 10 illustrates the horizontal interpolator of FIG. 3 in more detailed block diagram form.

FIG. 10 illustrates horizontal interpolator 46 of FIG. 3 in more detailed block diagram form. Interpolator 46 converts the input data sequence conveying an M×L pixel data matrix of values X'(m,l) into an output data sequence conveying a N×L pixel data matrix of values X"(n,l). For horizontal interpolator 46, N>M so the output image has more pixels per line than the input image. If the input and output images have the same dimensions and are superimposed, each pixel of the output image would either coincide with a pixel of the input image or would be horizontally bounded by two adjacent pixels of the input image. Interpolator 46 computes the value X"(n,l) of each output image pixel as either the value X"(m,l) of its coincident pixel of the input image, if any, or as a weighted average of values X'(m-1,l) and X'(m,l) of its two horizontally bounding input image pixels. The weighting applied to each input image pixel value varies inversely with the distance of the input pixel to the output image pixel. Interpolator 46 of FIG. 10 calculates each value X"(n,l) of the output matrix according to the following algorithm (expressed in pseudocode):

```
A(0) = 1
For 1 = 1 to L
    For n = 1 to N
        A(n)   = modulo(A(n-1)+(M-N),N)
        X"(n,1) = A(n)X'(m,1)+[N-A(n)]X'(m,l-1)
        If A(n-1) + (M-N) < N then m = m + 1
    Next n
Next 1
End
```

Referring to FIG. 10, an adder 160 clocked by the CLOCK_OUT signal produces the weighting coefficient A(n) by accumulating an input constant M-N. Adder 140 acts as an modulo N accumulator, incrementing its output A(n) by an input constant M-N for each pixel of each line of the output image and overflowing whenever the count reaches input control data value N. When the count reaches an overflow limit determined by input constant K, adder 160 deasserts an overflow signal OF applied via an inverter 161 to an input of an AND gate 164 having the CLOCK_OUT signal as a second input. AND gate 164 generates the READ signal supplied to sequencer 48 of FIG. 3 on each pulse of the CLOCK_OUT signal when adder 160 overflows.

A subtractor 166 subtracts the A(n) output of adder 160 from 1 to produce the term N-A(n). A delay circuit 168 clocked by the CLOCK_OUT signal stores an incoming pixel data value X'(m,l) one each CLOCK_OUT signal pulse when enabled by the READ signal and produces that pixel data value at its output one CLOCK_OUT cycle later as the data value X'(m-1,l). A multiplier 170 multiplies the outputs of delay circuit 168 and subtractor 166 to produce the term [1-A(n)]X'(n-1,l). A multiplier 172 multiplies the incoming X'(m,l) value by the A(n) output of adder 160 to produce the term A(n)X'(m,l). A summer 174 adds the outputs of multipliers 170 and 176 to generate output value X"(n,l).

Table III below illustrates a simple example of horizontal interpolator 46 operation when generating one line (l) of pixel data for an output image having 5 pixels per line (N=5) in response to an input image having 4 pixels per line (M=4). For simplicity the "l" subscripts of X' and X" have been dropped.

TABLE III

| n | m | A(n) | OF | X"(n) |
|---|---|------|-----|-------|
| 0 | 0 | 4 | 0 | 4*X'(0) |
| 1 | 1 | 3 | 0 | 3*X'(1)+1*X'(0) |
| 2 | 2 | 2 | 0 | 2*X'(2)+2*X'(1) |
| 3 | 3 | 1 | 0 | 1*X'(3)+3*X'(2) |
| 4 | 3 | 0 | 1 | 0*X'(3) 4*X'(3) |

As may be seen from TABLE III interpolator 46 generates a sequence of five output pixel values X"(n) (n=0 to 4) while it reads in only four input pixel data values X'(m) (m=0 to 3). In this example, output image pixels at positions n=0 and n=4 coincide with input image pixels at positions m=0 and m=3. The output pixel at position n=1 is bounded by input image pixels at positions m=0,1, the output pixel at position n=2 is bounded by input image pixels at positions m=2,3, and the output pixel at position n=3 is bounded by input image pixels at positions m=2,3. For the output pixel at position n=4, adder 160 overflowed and inhibited the READ pulse output of ADDER 164.

Horizontal interpolator decimator 72 of FIG. 6 is substantially similar in construction and operation to horizontal interpolator 46 of FIG. 3 and is not separately detailed herein.

Thus has been described a video converter 10 for converting an input video signal conveying pixel data representing an M×K pixel image to an output video signal conveying data representing an N×L pixel image. The converter samples the input video signal to acquire an N×K matrix of pixel data, re-encodes each pixel data value as necessary to meet requirements of the output video signal, and then employs digital interpolation and/or decimation as necessary to convert the N×K data matrix to an M×L data matrix. A simple digital output encoder 18 operating at four times the subcarrier frequency is then employed to process the M×L matrix to produce a digital output data sequence YUV' which when applied to D/A converter 20 becomes the output video signal.

While the forgoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A video converter for converting an input analog signal having a first subcarrier frequency and representing an M by K pixel image to an output analog signal having a second subcarrier frequency and representing an N by L pixel image, wherein M, K, N and L are integers greater than 1, wherein said first and second subcarrier frequencies differ, the video converter comprising:

means for digitizing the input analog signal at first rate to produce a first sequence of digital pixel data elements, each pixel data element of said first sequence representing a separate pixel of said M by K pixel image;

means for converting said first sequence of pixel data elements into a second sequence of pixel data elements, each pixel data element of said second sequence representing a separate pixel of said N by L pixel image;

means for processing said second sequence of pixel data elements to produce an output digital data sequence at a second rate that is an integer multiple of said second subcarrier frequency and differing from said first rate, the output digital data sequence representing said output video signal; and means for converting said output data sequence into said output video signal.

2. The video converter in accordance with claim 1 wherein said means for converting said first sequence of pixel data elements into a second sequence of pixel data elements comprises:

memory means, means for processing said first sequence at said first rate to produce a third sequence of pixel data representing an M by L pixel image and for storing said third sequence in said memory means, and means for reading said third sequence out of said memory means and processing said third sequence to produce pixel data elements of said second sequence at said second rate.

3. The video converter in accordance with claim 1 wherein said means for converting said first sequence of pixel data elements into a second sequence of pixel data elements comprises:

memory means, means for processing said first sequence at said first rate to produce a third sequence of pixel data representing an N by K pixel image and for storing said third sequence in said memory means, and means for reading said third sequence out of said memory means and processing said third sequence to produce pixel data elements of said second sequence at said second rate.

4. The video converter in accordance with claim 1 wherein said means for converting said first sequence of pixel data elements into a second sequence of pixel data elements comprises:

memory means, means for processing said first sequence to produce and store in said memory means pixel data elements of said second sequence at said first rate, and means for reading said second sequence out of said memory means at said second rate.

5. The video converter in accordance with claim 1 wherein said means for converting said first sequence of pixel data elements into a second sequence of pixel data elements comprises:

memory means for receiving and storing pixel data elements of said first sequence at said first rate, and means for reading said first sequence out of said memory means and for processing said first sequence to produce pixel data elements of said second sequence at said second rate.

6. The video converter in accordance with claim 1 wherein said second rate is four times said second subcarrier frequency.

7. The video converter in accordance with claim 6 wherein said means for processing said second sequence comprises means for receiving each pixel data element of said second sequence and for producing in response thereto a digital data value of said output sequence having a value proportional to a sum of Y and an element of the set {V,U,−V and −U} wherein Y is a luminance component and U and V are chrominance components of said pixel data element of said second sequence.

8. A video converter for converting an RGB-encoded input analog signal having a first subcarrier frequency and representing an M by K pixel image, to a YUV-encoded output analog signal having a second subcarrier frequency and representing an N by L pixel image, wherein M, K, N and L are integers greater than 1, wherein the M by K pixel image and the N by L pixel images have differing numbers of pixels, and wherein said first subcarrier frequency does not equal said second subcarrier frequency, the video converter comprising:

a first converter adapted to digitize the input analog signal at first rate to produce a first sequence of pixel data elements, each pixel data element of said first sequence employing RGB encoding to represent a separate pixel of said M by K pixel image;

a first encoder adapted to convert each pixel data element of said first sequence from RGB to YUV encoding;

a second converter adapted to convert the first sequence of YUV-encoded pixel data elements into a second sequence of YUV-encoded pixel data elements, each pixel data element of said second sequence representing a separate pixel of said N by L pixel image;

a second encoder adapted to process said second sequence of YUV-encoded pixel data elements to produce an output digital data sequence at a second rate that is an integer multiple of said second subcarrier frequency and that differs from said first rate, the output digital data sequence representing said output video signal; and third converter adapted to convert said output data sequence into said output video signal.

9. The video converter in accordance with claim 8 wherein said second converter adapted to convert said first sequence of pixel data elements into a second sequence of pixel data elements comprises:

memory;

means for processing the YUV-encoded first sequence at said first rate to produce a third sequence of YUV-encoded pixel data elements representing an M by L pixel image and for storing said third sequence in said memory; and means for reading said third sequence out of said memory and processing said third sequence to produce pixel data elements of said second sequence at said second rate.

10. The video converter in accordance with claim 8 wherein said second converter adapted to convert said first sequence of YUV-encoded pixel data elements into a second sequence of YUV-encoded pixel data elements comprises:

memory;

means for processing the YUV-encoded first sequence at said first rate to produce a third sequence of pixel data representing an N by K pixel image and for storing said third sequence in said memory; and means for reading said third sequence out of said memory and processing said third sequence to produce pixel data elements of said second sequence at said second rate.

11. The video converter in accordance with claim 8 wherein said second converter adapted to convert said first sequence of YUV-encoded pixel data elements into a second sequence of YUV-encoded pixel data elements comprises:

memory;

means for processing the YUV-encoded first sequence to produce and store in said memory YUV-encoded pixel data elements of said second sequence at said first rate; and means for reading said second sequence out of said memory at said second rate.

12. The video converter in accordance with claim 8 wherein said second converter adapted to convert the YUV-encoded first sequence of pixel data elements into a second sequence of YUV-encoded pixel data elements comprises:

memory for receiving and storing pixel data elements of said YUV-encoded first sequence at said first rate; and means for reading said first sequence out of said memory and for processing said first sequence to produce pixel data elements of said second sequence at said second rate.

13. The video converter in accordance with claim 8 wherein said second rate is four times said second subcarrier frequency.

14. The video converter in accordance with claim 13 wherein said second encoder adapted to process said second sequence of YUV-encoded pixel data elements to produce an output digital data sequence at a second rate that is an integer multiple of said second subcarrier frequency comprises:

means for receiving each YUV-encoded pixel data element of said second sequence and for producing in response thereto an output data value proportional to a sum of Y and an element of the set wherein Y is a luminance component and U and V are chrominance components of said YUV-encoded pixel data element of said second sequence.

15. A method for converting an input analog signal having a first subcarrier frequency and representing an M by K pixel image to an output analog signal having a second subcarrier frequency and representing an N by L pixel image, wherein M, K, N and L are integers greater than 1, wherein said first and second subcarrier frequencies differ, the method comprising the steps of:

digitizing the input analog signal at first rate to produce a first sequence of digital pixel data elements, each pixel data element of said first sequence representing a separate pixel of said M by K pixel image;

converting said first sequence of pixel data elements into a second sequence of pixel data elements into a second sequence of pixel data elements, each pixel data element of said second sequence representing a separate pixel of said N by L pixel image;

processing said second sequence of pixel data elements to produce an output digital data sequence at a second rate that is an integer multiple of said second subcarrier frequency and differing from said first rate, the output digital data sequence representing said output video signal; and converting said output data sequence into said output video signal.

16. The method in accordance with claim 15 wherein the step of converting said first sequence of pixel data elements into a second sequence of pixel data elements further comprises the steps of:

processing said first sequence at said first rate to produce a third sequence of pixel data representing an M by L pixel image and for storing said third sequence in a memory; and reading said third sequence out of said memory and processing said third sequence to produce pixel data elements of said second sequence at said second rate.

17. The method in accordance with claim 15 wherein the step of converting said first sequence of pixel data elements into a second sequence of pixel data elements further comprises the steps of:

processing said first sequence at said first rate to produce a third sequence of pixel data representing an N by K pixel image and for storing said third sequence in memory; and reading said third sequence out of said memory and processing said third sequence to produce pixel data elements of said second sequence at said second rate.

18. The method in accordance with claim 15 wherein the step of converting said first sequence of pixel data elements into a second sequence of pixel data elements further comprises the steps of:

processing said first sequence to produce and store in memory pixel data elements of said second sequence at said first rate; and reading said second sequence out of said memory at said second rate.

19. The method in accordance with claim 15 wherein the steps of converting said first sequence of pixel data elements into a second sequence of pixel data elements further comprises the steps of:

receiving and storing pixel data elements of said first sequence at said first rate in memory; and reading said first sequence out of said memory; and processing said first sequence to produce pixel data elements of said second sequence at said second rate.

20. The method in accordance with claim 15 wherein said second rate is four times said second subcarrier frequency.

21. The method in accordance with claim 20 wherein said means for processing said second sequence comprises means for receiving each pixel data element of said second sequence and for producing in response thereto a digital data value of said output sequence having a value proportional to a sum of Y and an element of the set wherein Y is a luminance component and U and V are chrominance components of said pixel data element of said second sequence.

* * * * *